Nov. 9, 1965  E. W. KOTHE  3,216,636
CABLE LAYING AND RETRIEVING APPARATUS AND METHOD
Filed Sept. 10, 1962  2 Sheets-Sheet 1

INVENTOR.
ERICH W. KOTHE
BY V. F. Voek
HIS AGENT

Nov. 9, 1965   E. W. KOTHE   3,216,636
CABLE LAYING AND RETRIEVING APPARATUS AND METHOD
Filed Sept. 10, 1962   2 Sheets-Sheet 2

INVENTOR.
ERICH W. KOTHE
BY  J. F. Volk
HIS AGENT

United States Patent Office 3,216,636
Patented Nov. 9, 1965

3,216,636
CABLE LAYING AND RETRIEVING
APPARATUS AND METHOD
Erich W. Kothe, White Plains, N.Y., assignor, by mesne assignments, to Anaconda Wire and Cable Company, a corporation of Delaware
Filed Sept. 10, 1962, Ser. No. 222,299
6 Claims. (Cl. 226—1)

My invention relates to an apparatus and method for laying and/or retrieving cable such as submarine cable and particularly to such apparatus comprising caterpillar grips.

In laying submarine cables in deep water a great weight of cable may at any time be suspended between the sea bottom and the ship's paying-off mechanism. The cable must, of course, be strong enough to support this load and may be armored for that purpose. But in many modern submarine cable constructions there is no armor over the cable as a whole and the tensile load is supported by a high-strength strand in the cable core. Where such a cable is passed over a deck sheave the tensile strand tends to cut radially through the insulation. This is not unexpected since the strand is supporting the entire weight of suspended cable. Increasing the diameter of the sheave tends to reduce the danger of cut-through by distributing the load over a greater area but there is a limit to the size of sheave it is practicable to use. If, instead of using a sheave the cable is paid directly from a drum capstan the same objection applies and efforts have been made to use caterpillar capstans for paying off submarine cables. The caterpillar capstan has the advantage that the caterpillar treads can apply compression to the cable from all sides but if the cable is paid directly off the deck of a ship from a conventional caterpillar capstan there will still be a point where the cable is bent around a short radius from the leading treads of the caterpillar and the load of the suspended cable will compress the tension strand against the insulation at this point.

I have invented a cable capstan comprising a pair of opposing endless caterpillar treads with a straight cable-gripping length moving in contact with the cable, a clevis mounting the treads so as to pivot within the clevis on a horizontal axis normal to the line of motion of the straight length, and means for braking and driving the treads. Preferably the clevis mounting my capstan is rotatable on a vertical axis.

I have invented the means of retrieving submarine cable comprising the steps of continuously hauling the cable in at an angle oblique to the horizontal and, seizing the cable at a plurality of points along the same line so as to successively relieve the tension without bending the cable. In my method the cable is bent at a point where the tension is sufficiently reduced to avoid damaging it and collected while relatively free from tension into cable-storing means.

I have also invented the method of laying cable from a travelling supply comprising the steps of continuously paying the cable from a cable-storing means while it is relatively free from tension and, while it is still free from tension, bending the cable to a line at an angle oblique to the horizontal. I then seize the moving cable at a plurality of points at successively increasing tension along the same line without further bending it, and continuously lower the cable along this line to its point of deposit.

A more thorough understanding of my invention can be gained from the appended drawing.

Figure 1:
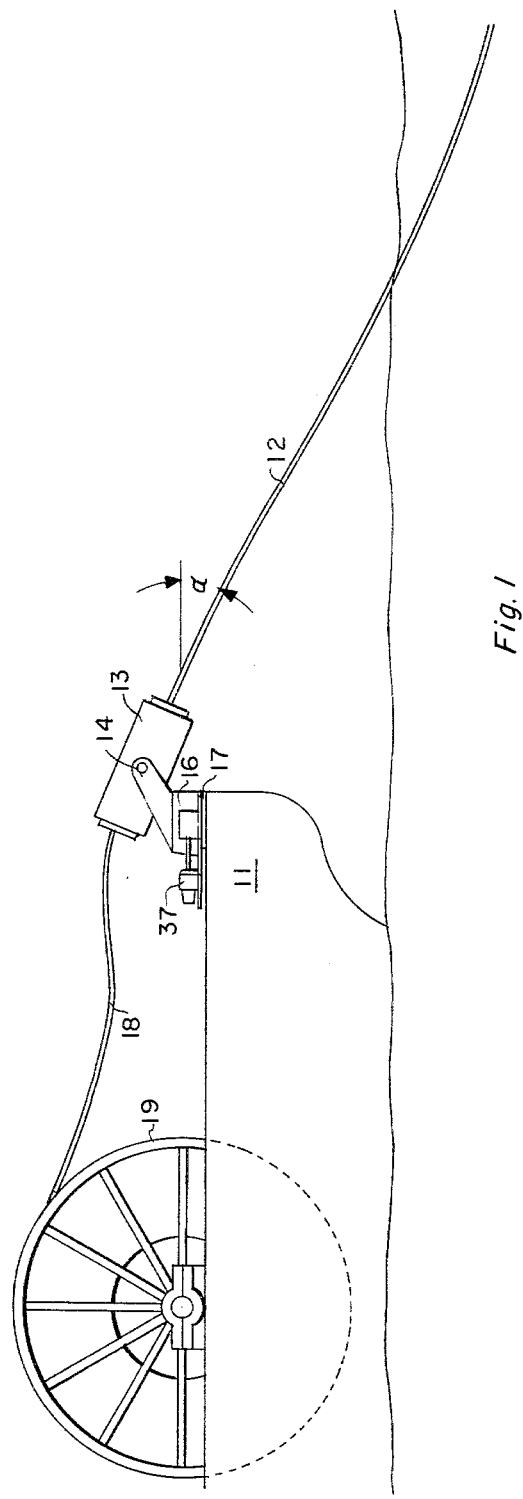
FIGURE 1 is a side view of the stern of a ship paying off cable with an apparatus of my invention.

Referring to FIGURE 1 my cable capstan is seen mounted on the deck of a cable-laying vessel 11 in such a manner that a cable 12 can be paid off the stern of the vessel vertically, if need be, horizontally, or at any angle inbetween. The cable 12 is gripped in a caterpillar capstan 13 mounted to pivot on a horizontal axis in a clevis 14 that extends from a turret 16 rotatable on a vertical axis on a table 17. As shown in FIGURE 1 the vessel 11 is moving forward so that the cable 12 forms an oblique angle $\alpha$ with the horizontal. The capstan 13 being freely pivotal in the clevis 14 has assumed the same angle as the cable 12. The cable 12, astern of the vessel 11, is under tension due to its weight, and the elements of the capstan 13, turret 16 and table 17 must be substantial enough to support the weight of the cable 12 plus the inertial forces due to vertical displacement of the ship. Inboard of the capstan 13 the cable 12 forms a slack loop 18 to a storage reel 19. It is possible for the cable 12 to be slack between the reel 19 and the capstan 13 because the load of the cable and all the tension therein is absorbed by the capstan 13.

Figure 2:
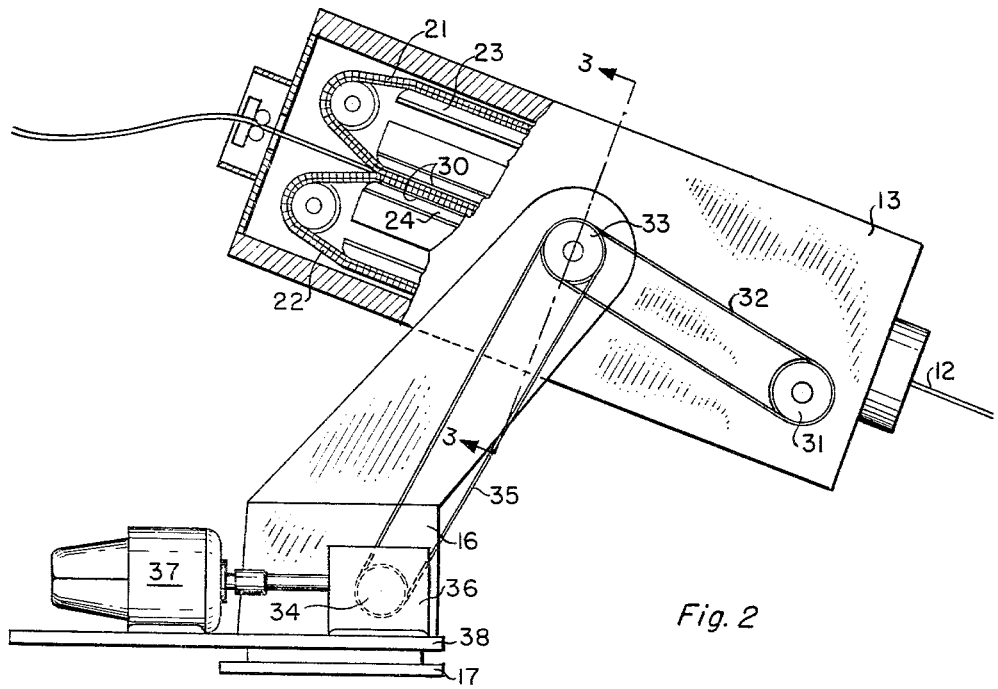
FIGURE 2 is a partly sectionalized side view of an apparatus made in accordance with my invention.
Figure 3:
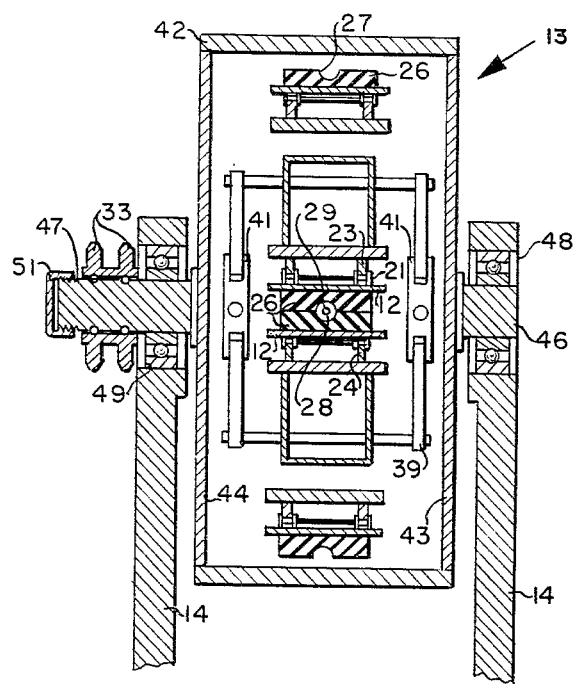
FIGURE 3 is a section through the line 3—3 of FIGURE 2.

As can best be seen by reference to FIGURES 2 and 3 the capstan 13 is comprised of a pair of treads comprised of endless chains 21, 22 rolling on respective tracks 23, 24 and resilient blocks 26 with grooves 27 that fit the contour of the cable 12. The tracks 23, 24 have a straight length 30 which guides the blocks 26 in a straight path while they are gripping the cable 12. In FIGURE 3 the cable 12 is seen to have a central tensile member 28 and surrounding insulation 29. Included within the area indicated by the numeral 29 in the section of the cable 12 there may, of course, be pairs of insulated telephone conductors and/or other conducting elements such as concentric conductors which have not been shown for the sake of clarity. The weight of the cable 12 is supported by the member 28 and it is a feature of my invention that the blocks 26 compress the insulation 29 and any conducting elements included therein against the tensile member 28 radially from all sides. In my method of laying or retrieving submarine cable each succeeding pair of gripping blocks 26 absorbs a portion of the load of the cable by means of the radial pressure so that the tensile member 28 of the cable entering the inboard end of the capstan is entirely free from the load of the cable laid astern. The chains 21, 22 are driven by means of a sprocket 31, chain 32, double sprocket 33, chain 35, sprocket 34, reducing gear 36 and motor 37. The motor 37 and gear 36 are mounted on a platform 38 that forms part of the turret 16 and turns therewith. Compression of the blocks 26 against the cable 12 is controlled by means of a link mechanism 39 which supports the tracks 23, 24 and is actuated to draw them together by toggles 41 in a known manner.

When cable is being paid overboard the motor 37 serves as a brake and when the capstan is used to retrieve or haul up cable the motor drives the capstan treads in the appropriate manner. Although I prefer this method of braking my cable capstan, I do not wish to be limited thereto and it will be readily understood that other braking means may be used within the scope of my invention.

The capstan 13 is mounted in a case 42 having sturdy side walls 43, 44 to which are welded stub shafts 46, 47 which are free to rotate in roller bearings 48, 49 in the clevis 14. The stub 47 projects beyond the bearing 49 and the double sprocket 33 is rotatably mounted thereon. A cap 51 prevents the sprocket 33 from sliding off the end of the shaft 47.

Even though the capstan 13 is free to follow the line of the cable 12 through both horizontal and vertical angles every element of my apparatus is rigidly fixed to the deck of the vessel 11 through the table 17. This stability is important on a swaying vessel and adds considerably to the value and utility of my apparatus.

I have invented a new and useful apparatus and method for which I desire an award of Letters Patent.

I claim:

1. The method of retrieving submarine cable freely suspended from the deck of a vessel to the sea bottom comprising the steps of:
   (A) continuously hauling in said cable in a line having a substantially straight portion at an angle oblique to the horizontal,
   (B) gripping said moving cable being hauled in, at a plurality of adjacent points, along an extended length of said portion, so as to successively relieve the tension in said cable without bending the same,
   (C) bending said cable at a point where the tension is sufficiently reduced to avoid damaging the same,
   (D) continuously collecting said cable relatively free from tension into cable-storing means.

2. The method of laying submarine cable freely suspended from the deck of a vessel to the sea bottom comprising the steps of:
   (A) continuously paying said cable while relatively free from tension from a cable-storing means and while still relatively free from tension bending said cable to a line having a substantially straight portion at an angle oblique to the horizontal,
   (B) gripping said moving cable being paid, at a plurality of points at successively increasing tension along said portion, without further bending said cable,
   (C) continuously lowering said cable along said line to the point of deposit of said cable.

3. A cable capstan mechanism comprising:
   (A) a pair of opposing endless caterpillar treads each having a straight cable-gripping length movable in contact with said cable,
   (B) means substantially coextensive with said caterpillar treads supporting and maintaining said treads in opposed relationship,
   (C) means positioned substantially centrally of said supporting means, mounting said supporting means for pivotal movement about a horizontal axis, and
   (D) means braking said treads against the weight of said cable.

4. A cable capstan mechanism comprising:
   (A) a pair of opposing endless caterpillar treads each having a straight cable-gripping length movable in contact with said cable,
   (B) means substantially coextensive with said caterpillar treads supporting and maintaining said treads in opposed relationship,
   (C) clevis means positioned substantially centrally of said supporting means mounting said supporting means for pivotal movement about a horizontal axis, and
   (D) means mounting said clevis means for rotation about a vertical axis.

5. A cable capstan mechanism comprising:
   (A) a pair of opposing caterpillar treads, each having a straight cable-gripping length movable in contact with said cable,
   (B) means substantially coextensive with said caterpillar treads supporting and maintaining said treads in opposed relationship,
   (C) means substantially central of said supporting means mounting said supporting means for pivotal movement about a horizontal axis, and
   (D) motor means driving said treads.

6. A cable capstan mechanism comprising:
   (A) a pair of opposing caterpillar treads, each having a straight cable-gripping length movable in contact with said cable,
   (B) means substantially coextensive with said caterpillar treads supporting and maintaining said treads in opposed relationship,
   (C) clevis means substantially central of said supporting means mounting said supporting means for pivotal movement about a horizontal axis,
   (D) motor means driving said treads, and
   (E) means mounting said clevis means for rotation about a vertical axis.

References Cited by the Examiner

UNITED STATES PATENTS

| | | | |
|---|---|---|---|
| 235,735 | 12/80 | Brooks | 254—134.3 |
| 446,214 | 2/91 | Wilson | 254—134.3 |
| 1,685,927 | 10/28 | Miller | 141—1 |
| 1,754,692 | 4/30 | Miller | 294—86 |
| 1,825,203 | 9/31 | Reibel | 89—1.34 |
| 2,031,003 | 2/36 | Neptune | 226—172 |
| 2,412,508 | 12/46 | Jensen | 242—54 |
| 2,647,699 | 8/53 | Bush | 226—172 X |
| 2,792,930 | 5/57 | Graham | 226—172 |
| 2,981,452 | 4/61 | Baker et al. | 226—1 |
| 2,981,454 | 4/61 | Dickinson et al. | 226—172 |

FOREIGN PATENTS 1,100,135  3/55  France.

ROBERT B. REEVES, *Primary Examiner.*

ANDRES H. NIELSEN, RAPHAEL M. LUPO,
*Examiners.*